Figure 10:
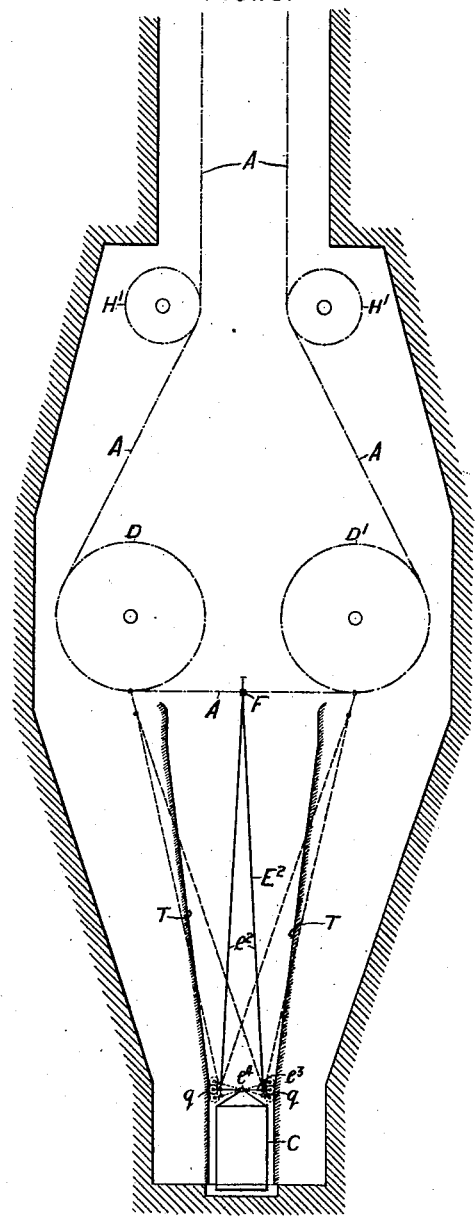

No. 637,092. Patented Nov. 14, 1899.
D. DAVY.
RAISING OR LOWERING APPARATUS FOR MINES, &c.
(Application filed Sept. 13, 1899.)
(No Model.) 5 Sheets—Sheet 1.
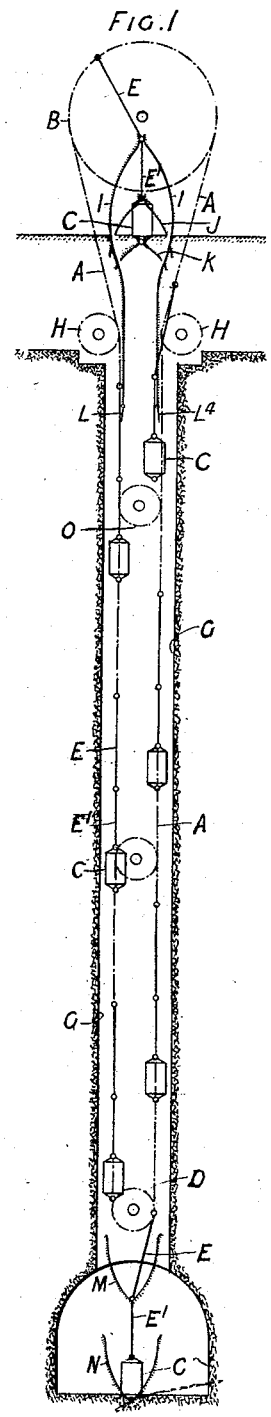
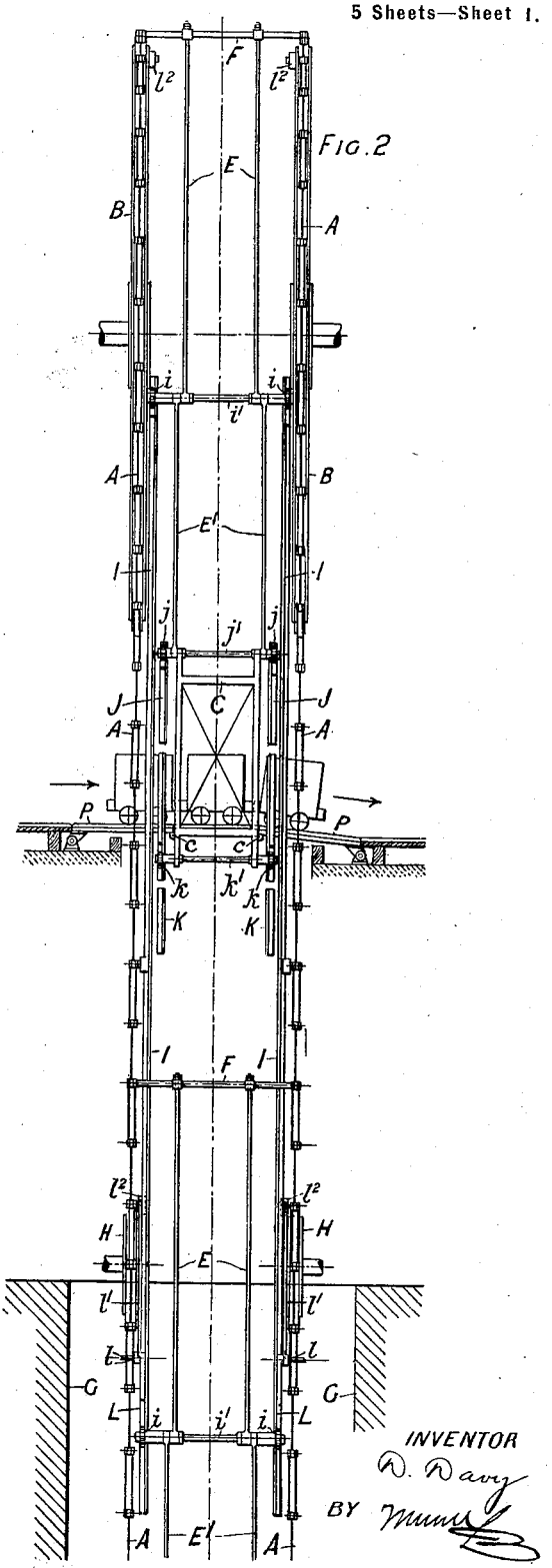
WITNESSES:
INVENTOR
BY
ATTORNEYS

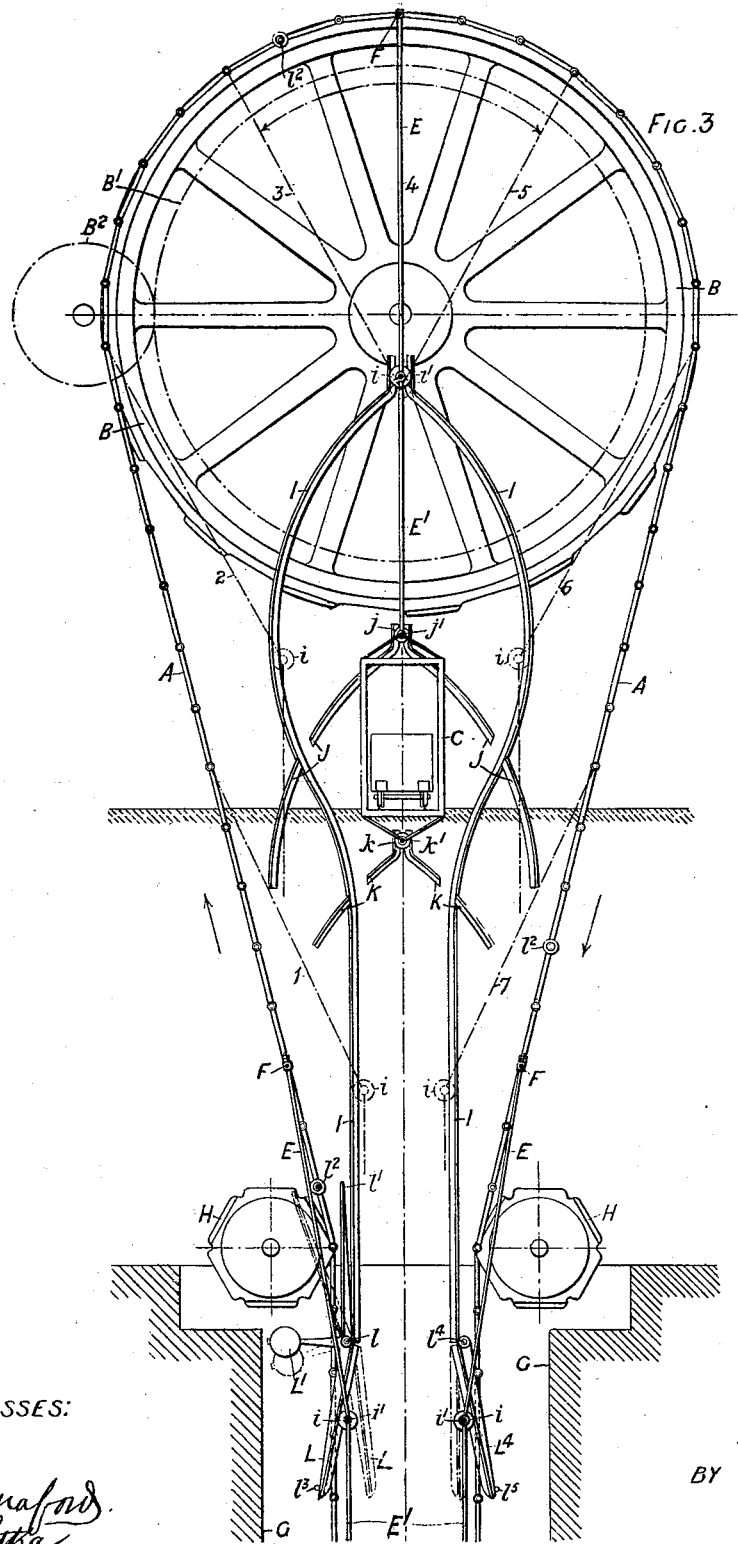

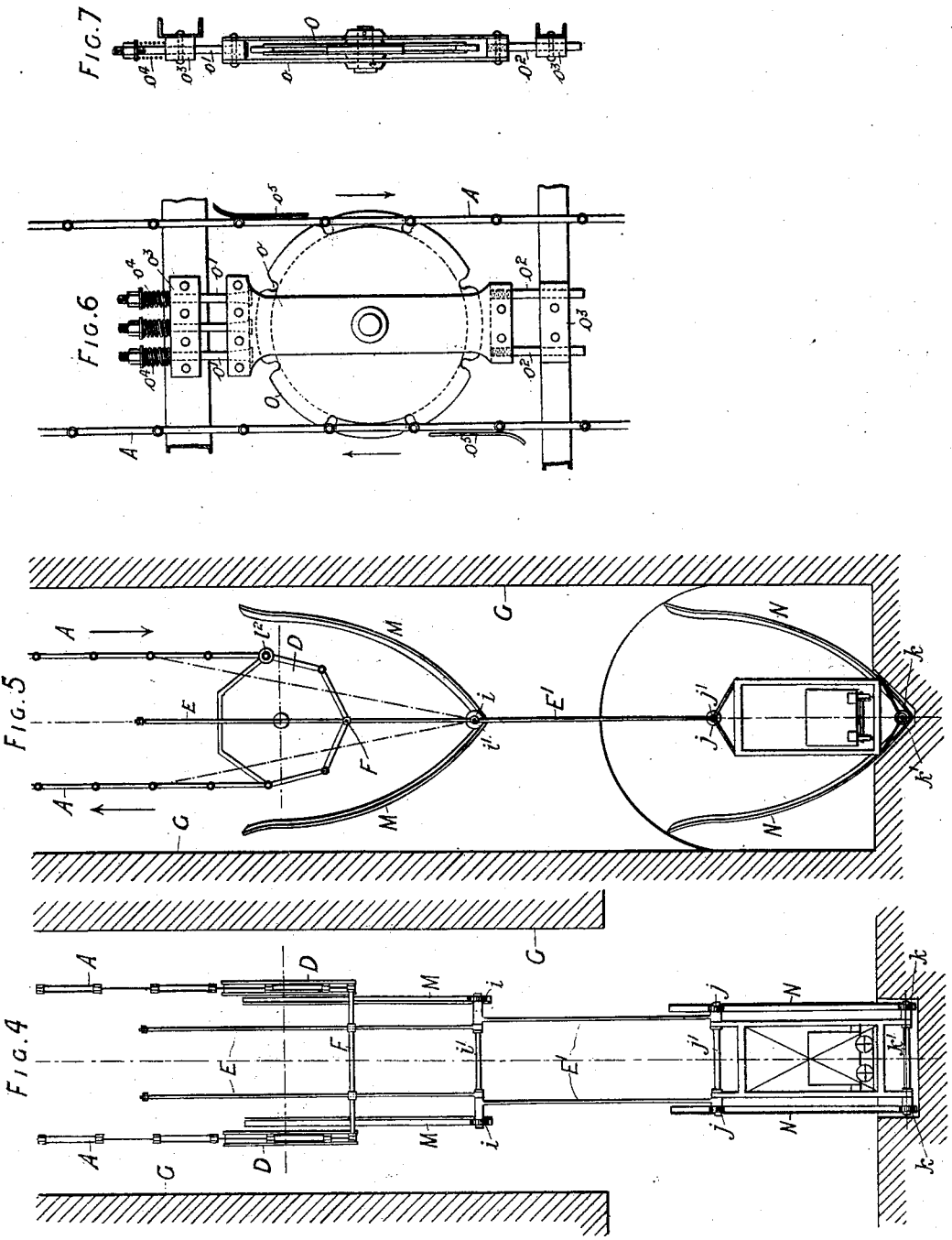

No. 637,092. Patented Nov. 14, 1899.
D. DAVY.
RAISING OR LOWERING APPARATUS FOR MINES, &c.
(Application filed Sept. 13, 1899.)
(No Model.) 5 Sheets—Sheet 4.
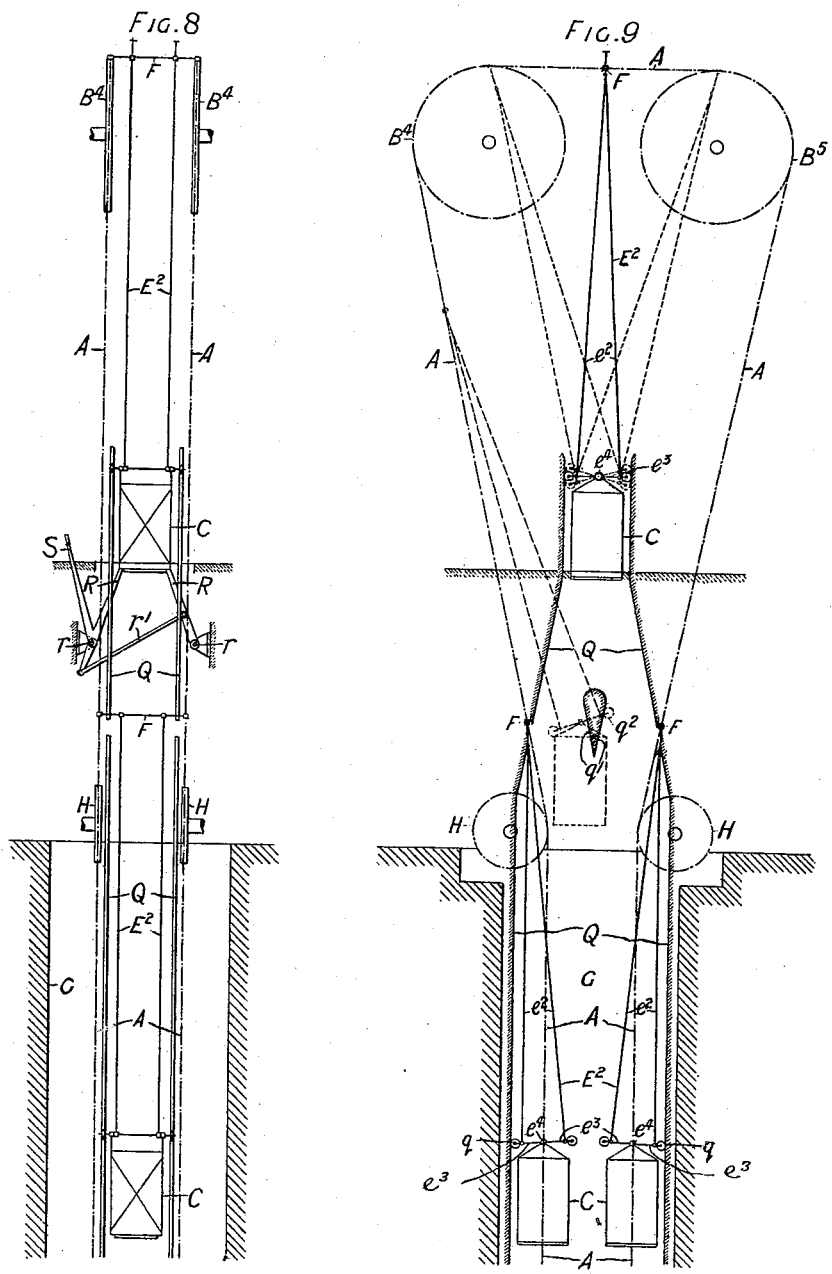
WITNESSES:
INVENTOR No. 637,092. Patented Nov. 14, 1899.
D. DAVY.
RAISING OR LOWERING APPARATUS FOR MINES, &c.
(Application filed Sept. 13, 1899.)
(No Model.) 5 Sheets—Sheet 5.

WITNESSES:

INVENTOR
D. Davy
BY
ATTORNEYS

UNITED STATES PATENT OFFICE.

DAVID DAVY, OF PARKHEAD, ENGLAND.

RAISING OR LOWERING APPARATUS FOR MINES, &c.

SPECIFICATION forming part of Letters Patent No. 637,092, dated November 14, 1899.

Application filed September 13, 1899. Serial No. 730,335. (No model.)

*To all whom it may concern:*

Be it known that I, DAVID DAVY, engineer, a resident of Broomcroft, Parkhead, near Sheffield, in the county of York, England, have invented new and useful Improvements in Raising or Lowering Apparatus for Mines and the Like, (for which an application for patent has been filed in Great Britain, dated December 5, 1898, No. 25,649,) of which the following is a full, clear, and exact description.

My invention relates to raising and lowering wheeled trolleys in coal-mines and the like, and has for its principal object greater expedition and regularity of delivery of the mineral at the surface, as well as to render overwinding impossible and insure greater safety, particularly when raising and lowering men.

My invention consists of an endless-chain elevator composed of a pair of endless chains having cages slung therefrom, in combination with guides whereby the cages are caused to deviate from the plane of the chains and to assume a position midway between the ascending and descending members of the chains on reaching the landing-stage at the top and bottom of the shaft, so that the cages will remain relatively stationary for a sufficient period at the dead-points of their motion to permit of loading and unloading the cages, although the chains will continue in motion.

The invention will be described with reference to the accompanying drawings, forming part of this specification, wherein—

Figure 1 is a diagrammatic vertical section of a mine-shaft fitted with my improved winding-gear. Figs. 2 and 3 are respectively a side elevation and vertical cross-section of the apparatus at the pit-mouth; and Figs. 4 and 5 are corresponding elevations forming continuations of Figs. 2 and 3, showing the apparatus at the foot of the shaft. Figs. 6 and 7 are front and side elevations of balance or relief pulleys for the main chains. Figs. 8, 9, and 10 show in an elementary manner a modified construction of the elevator.

The same letters and figures of reference indicate the same parts in all the figures.

Referring to Figs. 1 to 7, which show the preferred construction, A A are the pair of endless main chains, of any suitable construction, running on a pair of pulleys B B, of large diameter, above the pit-mouth and upon a pair of small pulleys D D at the foot of the shaft.

C are cages suspended by pairs of jointed links E E E' E' from cross-bars F, connected to the chains A A at intervals. The cages are suspended freely, so that they normally hang in the plane of the chains, the total length of the links being sufficient to allow of the cages being caused to deviate from the plane of the chains to an extent equal to half the diameter of the pulleys B by means of guides which act on them as the cages approach their highest position. In the arrangement now being described there is a single pair of pulleys B at the top and a single pair D at the bottom, the two pulleys of a pair being in axial alinement with each other, but not being connected by a through-shaft in order that the suspension-link of the cages may pass across the geometrical axis of the pulleys. The diameter of the pulleys B would generally be greater than that of the pit-shaft G, so that the ascending and descending members of the chains converge above the pit-mouth, being guided by pulleys H, while the cages are caused to move in the opposite direction—that is, are brought into a central position directly beneath the axis of the pulleys B by means of pairs of guide-rails I I, with which engage guide-rollers *i i* on the projecting ends of a cross-bar *i'*, forming the middle joint-pin of the pairs of links E E E' E'. The guides I I are straight and vertical at the lower part and rather nearer the median plane than the chains, the upper portions of the guides being outwardly curved, as shown, the curved portions of the guides, the pulleys B, and the links E being so relatively proportioned and arranged that the links E in passing around the pulleys will be caused to assume a succession of positions, such as indicated by dotted lines at 1 2 3 and 5 6 7 on the one and the other side of the middle position 4, shown in full lines. The upper ends of the curved guides extend vertically upward and at a distance from the median plane corresponding to the radius of the pulleys *i*, the guides I at the ascending and descending sides of the elevator being symmetrical. The radius-links E exceed in length the radius of the pulleys B, as shown, and therefore while the radius-links E are moving over the summit of the pulleys from position 3 to position 5 the guide-rollers $i$, and consequently the cage, will have a slight rising-and-falling motion, which is compensated for by the provision of hinged flaps, as hereinafter described.

In order to steady the cage on passing through the hatchway in the landing-stage, a second pair of guides J J and a third pair K K are provided, with which respectively engage a pair of guide-pulleys $j\ j$ (on the projecting ends of a cross-bar $j'$, mounted on top of the cage and to which the links E' are connected) and a pair of guide-pulleys $k\ k$, (on the ends of a cross-bar $k'$, mounted beneath the cage,) gaps being cut in the guides J K in order to give passage to the cross-bar $i'$ and rollers $i\ i$. The pairs of guides J K are situated in planes at a less distance apart than the main guides I, so that the cross-bars and rollers $j j'$ and $k k'$ will pass clear of the guides I.

In order to give passage to the cross-bars F and yet cause the rollers $i$ to engage with the guides I at the ascending side of the main chains, each guide-rail I is provided with a movable switch L, pivoted at $l$ and normally held in the position shown in dotted lines by the action of a counterbalanced lever L', the switch being provided with a tailpiece $l'$, which is presented in an inclined position to a roller $l^2$ on the main chain at the corresponding side at the proper distance in advance of the cross-bar $i'$ to cause the switch to be moved by the chain in opposition to the balance-weight until the switch is held against a fixed stop $l^3$ in an inclined position across the path of the roller $i$, so as to lead said roller onto the guide I. At the descending side the guides I are terminated by freely-pendent switch-tongues $L^4$, pivoted at $l^4$, which when the rollers $i\ i$ come upon them are swung against a stop $l^5$, as shown, and which yield to give passage to the cross-bar F. The form of the guides I is preferably that shown and is such that in passing the pulleys the suspension-links E will move through a succession of positions, such as indicated in dotted lines at 1 to 7, in which they never make a greater angle than, say, thirty degrees with the vertical or one hundred and fifty degrees with the links E', which latter always remain vertical. The guides I J K at each side are carried by a plate (not shown) fixed to the inner end of the shaft on which the pulley B at the corresponding side turns, the guides and their carrying-plates being therefore close against the inner faces of the pulleys B. These pulleys are sprocketed to engage with the chains and preferably turn on stationary shafts and are geared by spur-wheels B' on their outer faces with spur-wheels $B^2$ on a suitably-driven shaft common to both, so as to insure equality of motion.

At the foot of the pit-shaft G the chains A A run upon freely-revolving polygonal or flanged pulleys D D, and pairs of guides M N are provided, with which the rollers $i\ i\ k\ k$ engage, as shown, and whereby the cage is brought to and supported in the central position vertically beneath the axis of the pulleys D D while the cross-bars F are making the circuit of the said pulleys. To permit of this, the links E, if rigid rods, must be so connected to the cross-bar F as to be free to slide on the cross-bar, as shown, the cross-bar F itself forming a joint-pin of the main chains A A and being free to accommodate itself to the varying angular position of the links E, or the links E may be replaced by flexible chains.

The cages are open at the two opposite sides which correspond to the planes of the pulleys B and are adapted to be loaded and unloaded by running wheeled trolleys on and off the cage-floor, which has rails matching with rails on the landing-stages, the loading being effected at the pit-foot by pushing a loaded trolley on and an empty one off the cage-floor and conversely at the pit-mouth.

From the above-described construction it will be seen that the cages when they reach the upper landing-stage will remain comparatively stationary for a sufficient period to permit of loading and unloading the same, while the chains will continue in motion; but, as before stated, the cages will have a slight rising-and-falling motion at this time, and to compensate for this hinged flaps P are provided. The flaps P are normally supported at the level of the landing-stage, and their free edges engage projections $c$ on the bottom of the cage when the radius-links E of the cage reach the position 3, so that during the slight rise and fall of the cage while the links E are traversing the arc 3 4 5 the rails laid upon these flaps will continue to match with the rails of the cage-floor, the downward inclination of the flap at the outgoing side favoring the running off of the loaded trolley.

Referring now to Figs. 8 to 10, the chains A A pass over two pairs of pulleys $B^4\ B^5$ above the pit-mouth and similarly at the foot of the shaft, so that there will be a relatively considerable stretch of the chains in the horizontal direction and a correspondingly prolonged period of rest during the passage of the cross-bars F from the one pulley to the other. The chains pass over hexagonal drums H, as before, whence the ascending and descending members of each chain diverge in order to pass over the pulleys $B^4\ B^5$. The cages C are suspended from the cross-bars F by pairs of frames $E^2$, each formed of two divergent links $e^2$, connected to the opposite ends of a cross-bar $e^3$, jointed at $e^4$ to the top of the cage, so as to permit of the suspension-frames accommodating themselves to the inclination of the chains while the cages remain vertical. At the ends of the cross-bars $e^3$ are mounted guide-rollers $q$, of which the outer pair bear against guides Q, that extend down the pit-shaft, the guides at the ascending and descending sides of the chains being inclined toward one another above the drums H and terminating above the landing-stage in vertical portions, between which the rollers $q$ at opposite ends of the cross-bars $e^3$ fit, so as to hold the cage stationary while the cross-bar F, supporting the cage, is passing from the outside of the one pair to the outside of the other pair of pulleys.

In order to give passage to the cross-bars F where their path intersects the guides Q, gaps are cut in the latter, and in order to prevent the rollers which bear against the guides catching these gaps guard-rails or guides $q'$ are provided opposite such gaps and parallel to the inclined portion of the guide Q, with which the other pair of rollers $q$ engages, as shown in dotted lines at $q^2$, the operation being similar on the descending side. As the horizontal stretch of the chains A between the pulleys $B^4$ $B^5$ is incapable of supporting the loaded cage at a constant level while the cross-bar is passing from the one pair of pulleys to the other, it is necessary to provide pairs of props R R on cross shafts $r$, coupled (outside the guides Q) by a diagonal link $r'$, so that both pairs of props may be thrown inward simultaneously and engage beneath the floor of the cage as soon as it reaches its highest position and so support it in that position during the passage of the supporting cross-bar from the one pair of pulleys to the other. The props are thrown in and out of engagement with the cage at the proper moment by means of a hand-lever S.

At the foot of the shaft the chains A are guided divergently by a second pair of hexagon drums H' and pass around two pairs of pulleys D D'. While the cross-bar F, from which the cage is suspended, is following the divergent direction of the chain, the outermost pair of guide-pulleys $q$ engages a pair of guides T, by which the cage is gradually brought to the median plane of the ascending and descending members of the chains and comes to rest on an underneath support and so remains while the supporting cross-bar is passing from the one pair of pulleys to the other, the converse action taking place when the cage is again raised. In this, as in the former case, the suspension-links $e^2$, if rigid, must be free to slide upward through the cross-bar F to an extent corresponding to the difference between the arc described by their upper end and the straight line followed by the cross-bar.

In order to relieve the main chains A as far as possible of the strain due to their own weight and that of the cages and also in order to relieve the pulleys B of the greater part of the total weight of the chains, cages, &c., the total weight is subdivided and each portion thereof is sustained by independent means, as follows: The chains A are supported at intervals throughout the depth of the shaft, as indicated in Fig. 1, by gearing with pairs of sprocket-pulleys O, mounted to rotate freely each on an axis fixed to a frame $o$, supported by springs. Each pulley O is of a diameter corresponding to the distance apart of the ascending and descending side of the chain in whose plane the pulley revolves, so as to gear with both sides of the chain simultaneously, and the strength of the supporting-springs is made sufficient to sustain the weight of the ascending and descending portions of the chain comprised between that pulley and the next lower support, together with the weight of the included cages, so that instead of successive lengths of chain, counting from below upward, having to support an increased load each section of chain comprised between two adjacent pairs of supporting-pulleys has to support the weight of that section alone, together with the weight of the included cages.

Each of the frames $o$ is free to rise and fall within the limits of the tension of the supporting-springs and is guided in such vertical movements and at the same time caused to maintain the pulley O in the plane of the chain by means of rods $o'$ $o^2$ passing vertically through guide-blocks $o^3$, carried by girders fixed to the sides of the shaft, the supporting-springs $o^4$ being interposed between the blocks $o^3$ and nuts on the rods $o'$, so as to be capable of adjustment to the requisite tension. Fixed guides $o^5$ serve to maintain the ascending and descending sides of the chain A in gear with the pulley O.

I claim—

1. An endless-chain elevator consisting of a pair of continuously-traveling endless chains passing over pulleys, a series of cages suspended by links from the chains, and curved stationary guides at top and bottom whereby each cage on reaching the highest and lowest position is diverted from the direction followed by the chains and is brought into a position midway between the ascending and descending members of the chains and is there retained during the loading and unloading of the cage, substantially as herein described and illustrated in the drawings.

2. In a raising and lowering apparatus for mines and the like, the combination with a pair of continuously-traveling endless chains passing over pulleys at top and bottom and cages suspended from the chains, of relief or balance gear consisting of intermediate supports for the chains consisting of pairs of pulleys adapted to gear with the ascending and descending sides of the chains respectively so as to be rotated thereby and a spring-supported frame in which the pulleys are mounted substantially as specified.

3. In a raising and lowering apparatus, the combination of a pair of endless chains, pairs of pulleys over which the chains pass, the upper pulleys being considerably larger than the lower pulleys, cages suspended by jointed links from the endless chains, and a plurality of curved guides at the top and with which the links and cages engage, substantially as and for the purpose set forth.

Signed by the said DAVID DAVY this 31st day of August, 1899.

DAVID DAVY.

In presence of—
B. T. BURDEKIN,
RICHARD WHEELER.